(12) United States Patent
Satoh

(10) Patent No.: US 11,532,408 B2
(45) Date of Patent: Dec. 20, 2022

(54) PROTECTIVE MEMBER FOR WIRE HARNESS, AND BRANCHING STRUCTURE OF WIRE HARNESS

(71) Applicant: Yazaki Corporation, Tokyo (JP)

(72) Inventor: Harutake Satoh, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 17/066,148

(22) Filed: Oct. 8, 2020

(65) Prior Publication Data

US 2021/0110948 A1 Apr. 15, 2021

(30) Foreign Application Priority Data

Oct. 11, 2019 (JP) .............................. JP2019-187704

(51) Int. Cl.
*H01B 7/18* (2006.01)
*H01B 7/00* (2006.01)

(52) U.S. Cl.
CPC ........... *H01B 7/186* (2013.01); *H01B 7/0045* (2013.01)

(58) Field of Classification Search
CPC ............ B60R 16/0207; B60R 16/0215; H01B 7/0045; H02G 3/04
See application file for complete search history.

(56) References Cited

U.S. PATENT DOCUMENTS

2016/0019998 A1* 1/2016 Kawaguchi ...... H01B 13/01281
174/72 A

FOREIGN PATENT DOCUMENTS

| DE | 204946 C | | 3/1907 | |
|---|---|---|---|---|
| DE | 20111731 U1 | * | 10/2001 | ......... B60R 16/0215 |
| JP | 2009247070 A | * | 10/2009 | ............... H02G 3/04 |
| JP | 2010074927 A | * | 4/2010 | ............... H02G 3/04 |
| JP | 2012196036 A | * | 10/2012 | ............... H02G 3/04 |
| JP | 2013169116 A | * | 8/2013 | ......... B60R 16/0215 |
| JP | 2014230414 A | * | 12/2014 | ............ B60R 16/02 |
| JP | 2016-201330 A | | 12/2016 | |
| JP | 2017-011813 A | | 1/2017 | |
| JP | 3220854 U | * | 4/2019 | ............ B60R 16/02 |
| WO | 2015/001921 A1 | | 1/2015 | |

* cited by examiner

*Primary Examiner* — Paresh Paghadal
(74) *Attorney, Agent, or Firm* — Banner & Witcoff, Ltd.

(57) ABSTRACT

A protective member for a wire harness, having a branching point between a trunk harness and a branch harness, includes a protective sheet portion to be wound around an outer circumference of at least the trunk harness near the branching point; a pair of band-shaped fixing strip portions extending from the protective sheet portion and to be wound around on the trunk harness at a pair of spots. The branching point is between the pair of the spots. The protective member is formed from a resin. The fixing strip portions are smaller in thickness than the protective sheet portion.

5 Claims, 8 Drawing Sheets

PROTECTIVE MEMBER FOR WIRE HARNESS, AND BRANCHING STRUCTURE OF WIRE HARNESS

CROSS-REFERENCE TO RELATED APPLICATIONS

This application is based on and claims priority under 35 USC 119 from Japanese Patent Application No. 2019-187704 filed on Oct. 11, 2019, the contents of which are incorporated herein by reference.

TECHNICAL FIELD

The present invention relates to a protective member for a wire harness, and also to a branching structure of a wire harness.

BACKGROUND ART

Conventionally, a technique has been proposed in which a protective sheet having one surface functioning as a paste surface to which an adhesive material is applied is wound around a branching point of a wire harness where branch harness separate from trunk harness, thereby protecting the branching point. For example, a conventional protective sheet has a rectangular main portion, and lap winding portions that extend from the longitudinal ends of the main portion, respectively. When the main portion covers a branching point, and the lap winding portions are wound around trunk harness, the protective sheet is attached to the branching point.

As for details of the above protective sheet, refer to JP 2017-11813 A.

SUMMARY OF INVENTION

In order to improve the performance in which a branching point is protected by the above-described conventional protective sheet, it may be contemplated to increase the thickness of the protective sheet. When the thickness of the protective sheet is carelessly increased, however, the rigidity of the protective sheet is enhanced, and therefore the lap winding portions easily loosen. As a result, there is a possibility that the protective sheet attached to the wire harness unintentionally separates from the wire harness.

Aspect of non-limiting embodiments of the present disclosure relates to provide a protective member for a wire harness branching point that can achieve both an improvement of the performance to protect a branching point of a wire harness, and secure attachment to the branching point, and a branching structure of a wire harness in which the protective member is used.

According to an aspect of the present disclosure, there is provided a protective member for a wire harness having a branching point between a trunk harness and a branch harness, the protective member comprising:

a protective sheet portion to be wound around an outer circumference of at least the trunk harness near the branching point; and a pair of band-shaped fixing strip portions extending from the protective sheet portion and to be wound around on the trunk harness at a pair of spots, the branching point being between the pair of the spots, the protective member comprising a resin, the fixing strip portions being smaller in thickness than the protective sheet portion.

According to another aspect of the present disclosure, there is provided a branching structure comprising:

a wire harness having a branching point between a trunk harness and a branch harness;

and the protective member as described above, the protective member is attached to the branching point to wind the protective sheet portion around the outer circumference of at least the trunk harness near the branching point, and to wind the pair of the band-shaped fixing strip portions extending from the protective sheet portion around on the trunk harness at the pair of spots to sandwich the branching point.

DESCRIPTION OF EMBODIMENTS

Hereinafter, an embodiment of the invention will be described with reference to the drawings.

Figure 1:
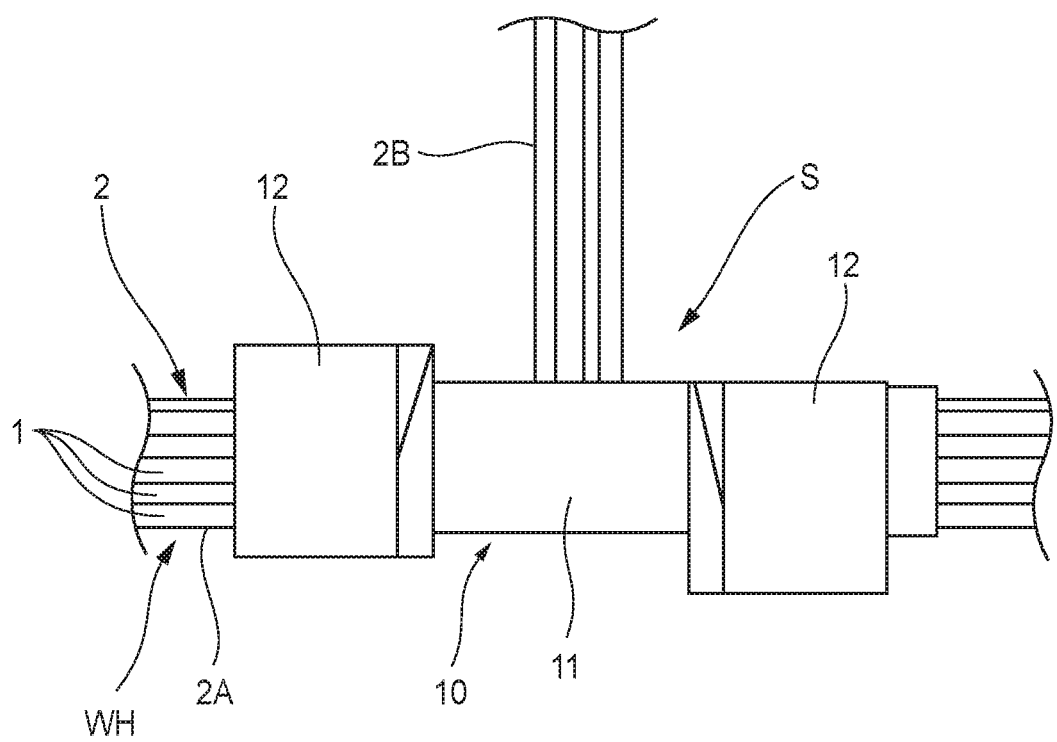
FIG. 1 is a side view of a branching point of a wire harness to which a protective member of an embodiment is attached.

As show in FIG. 1, a protective member 10 of the embodiment is to be attached to a T-shaped branching point S of a wire harness WH.

Figure 2:
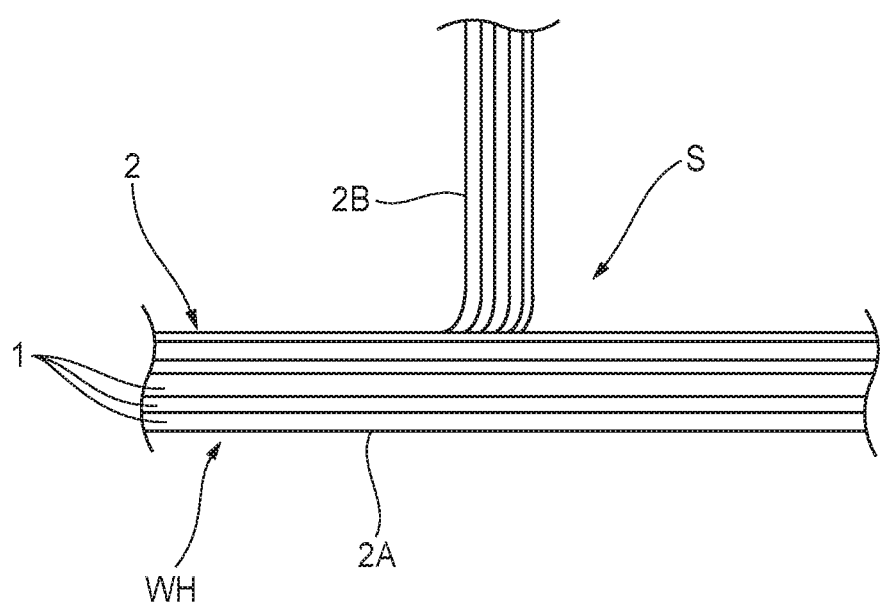
FIG. 2 is a side view of the branching point of the wire harness in which branch harness are separated from trunk harness.

As shown in FIG. 2, the wire harness WH has a wire bundle 2 in which a plurality of electric wires 1 are bundled. Each of the electric wires 1 is an insulated electric wire in which a conductor that is configured by bundling a plurality of element wires made of, for example, copper, a copper alloy, aluminum, or an aluminum alloy is covered by a jacket made of a resin material. The wire bundle 2 includes trunk harness 2A and branch harness 2B. In the branching point S, the branch harness 2B is drawn to the lateral side of the trunk harness 2A.

Figure 3:
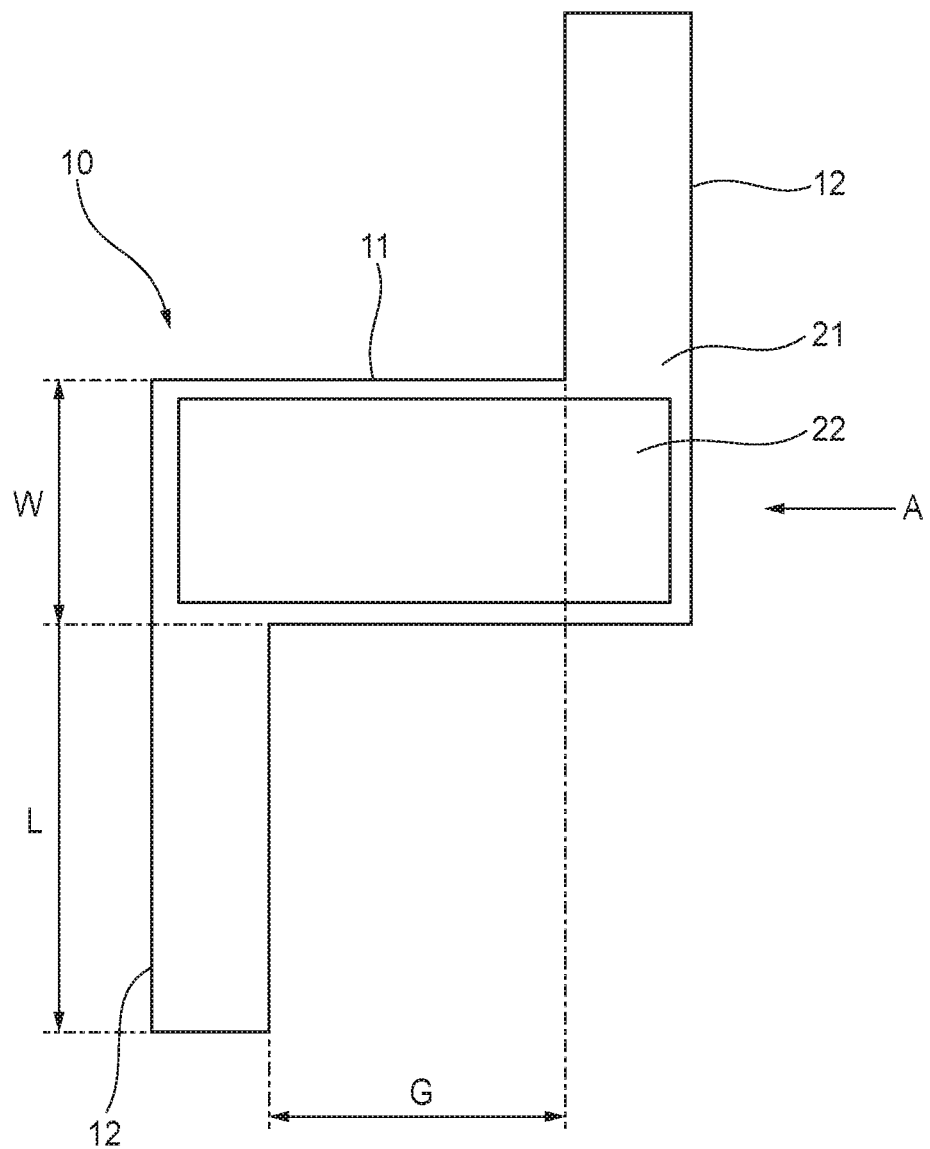
FIG. 3 is a plan view of the protective member of the embodiment.

As shown in FIG. 3, the protective member 10 has a protective sheet portion 11 and fixing strip portions 12. The protective sheet portion 11 is formed into a rectangular shape in a plan view. The fixing strip portions 12 are formed into a band-shaped shape, and disposed on the both sides of the protective sheet portion 11, respectively. The fixing strip portions 12 laterally extend from side portions of the both ends of the protective sheet portion 11, respectively. The fixing strip portions 12 extend from the protective sheet portion 11 in opposite directions, respectively.

In the protective sheet portion 11, the width W is approximately equal to the circumferential length of the trunk harness 2A, and the gap G between the fixing strip portions 12 is larger than the diameter of the branch harness 2B. Each of the fixing strip portions 12 has a length L that is larger than the circumferential length of at least the trunk harness 2A.

The protective member 10 has a first base member 21 and a second base member 22. Each of the first base member 21 and the second base member 22 is a sheet member made of a resin material. Examples of the resin material constituting the first base member 21 and the second base member 22 are vinyl chloride, polyester, and polyethylene.

The first base member 21 constitutes the whole region of the protective sheet portion 11 and fixing strip portions 12 in the protective member 10. The second base member 22 is formed into a rectangular shape in a plan view, and stacked on the protective sheet portion 11 of the protective member 10.

Figure 4:
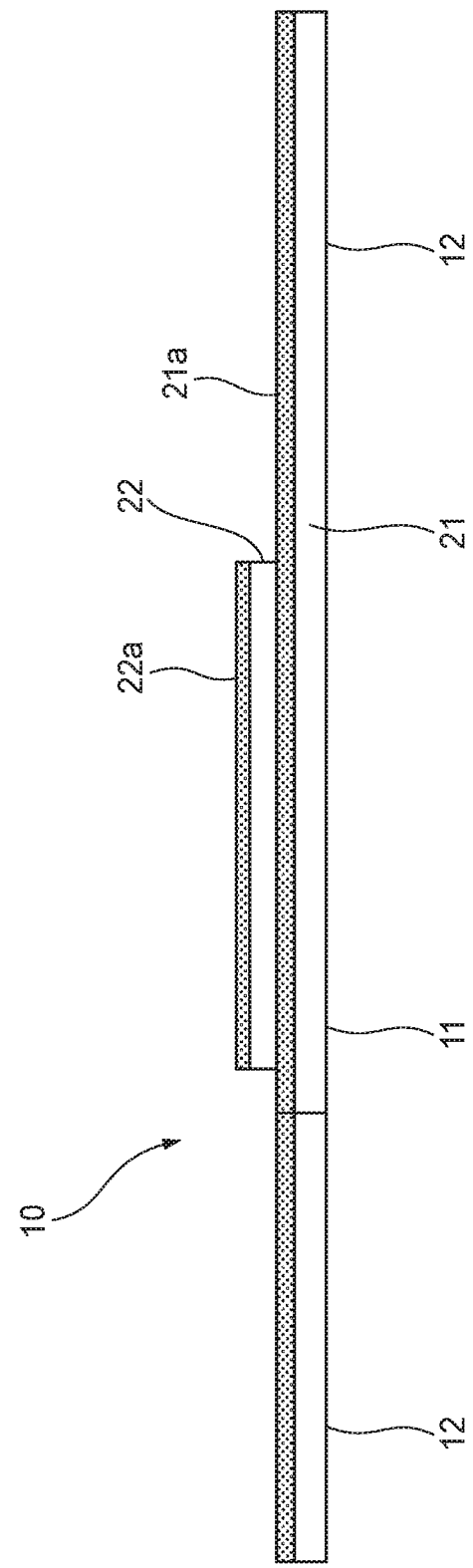
FIG. 4 is a view as seen in the direction of arrow A in FIG. 3.

As shown in FIG. 4, adhesive layers 21a, 22a are disposed respectively on the first base member 21 and the second base member 22 by applying an adhesive material on the surfaces of the members. The second base member 22 is stacked on the first base member 21, and therefore bonded and fixed by the adhesive layer 21a of the first base member 21. In the protective member 10 in which the second base member 22 is stacked on the first base member 21, the thickness of the fixing strip portions 12 is smaller than that of the protective sheet portion 11.

Next, the case where the protective member 10 is attached to the branching point S of the wire harness WH will be described.

Figure 5:
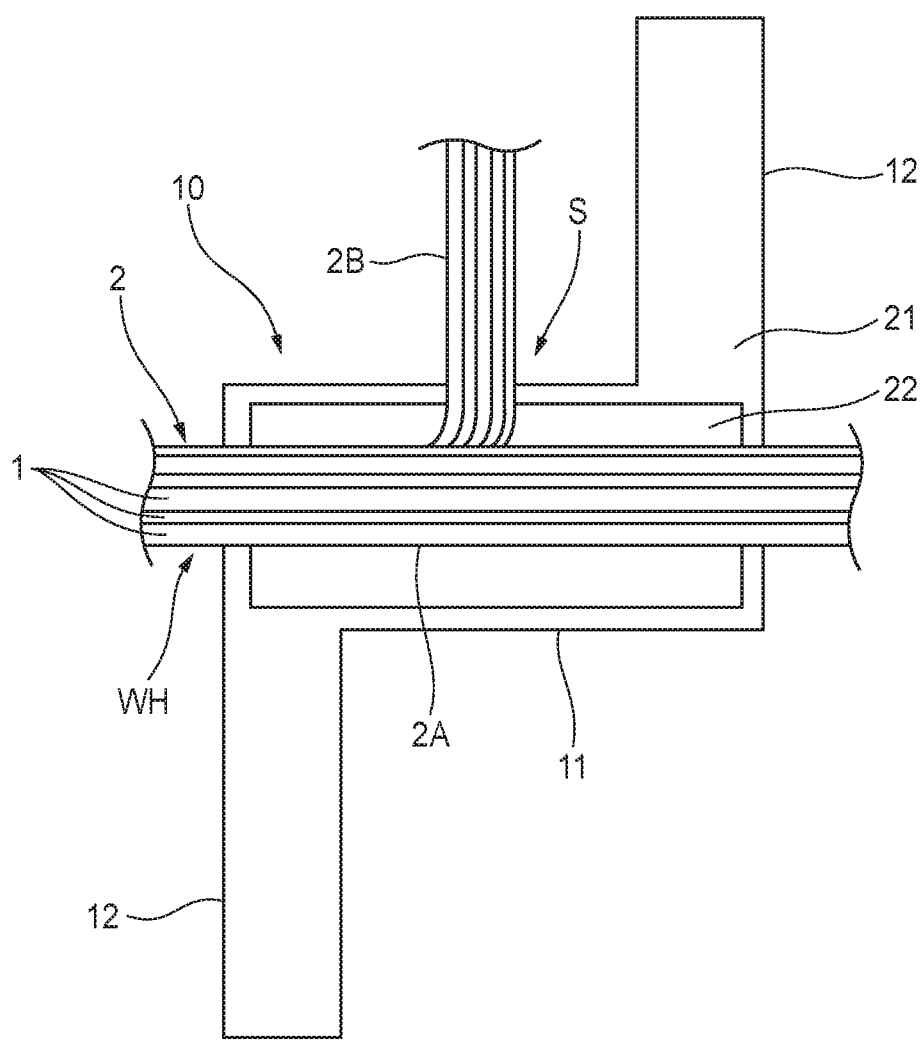
FIG. 5 is a plan view of the protective member on which the branching point of the wire harness is placed, describing the procedure of attachment of the protective member to the branching point.

As shown in FIG. 5, the branching point S of the wire harness WH is placed on the protective member 10 from the side of the adhesive layers 21a, 22a of the first base member 21 and the second base member 22. Specifically, the trunk harness 2A in the branching point S are placed in the middle in the width direction along the longitudinal direction of the protective sheet portion 11. At this time, the branch harness 2B are placed in the middle in the longitudinal direction of the protective sheet portion 11.

Figure 6:
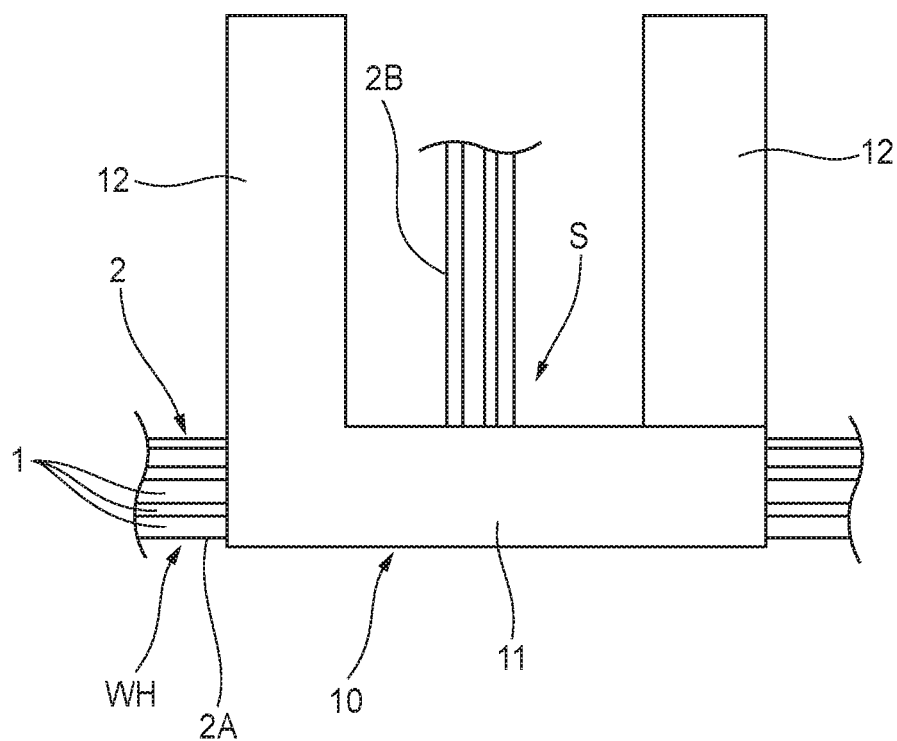
FIG. 6 is a schematic side view of the protective member that is in the course of attachment to the branching point of the wire harness, describing the procedure of attachment of the protective member to the branching point.

As shown in FIG. 6, the protective sheet portion 11 of the protective member 10 is bent toward the inner side where the wire harness WH is placed, and wound around the wire harness. As a result, the protective sheet portion 11 is bonded by the adhesive layer 22a disposed on the second base member 22 of the protective sheet portion 11, to the circumference of the trunk harness 2A of the wire harness WH. Therefore, a state is attained where the trunk harness 2A are covered by the protective sheet portion 11 of the protective member 10.

Thereafter, the fixing strip portions 12 of the protective member 10 are wound around the protective sheet portion in the opposite directions so that the adhesive layer 21a is in the inner side. As a result, parts that are in the vicinities of the both ends of the protective sheet portion 11 that cover the outer circumference of the trunk harness 2A are fixed by the fixing strip portions 12, respectively (see FIG. 1).

At this time, since the fixing strip portions 12 are thinner than the protective sheet portion 11, the rigidity of the fixing strip portions 12 is suppressed to be lower than that of the protective sheet portion 11. Therefore, the fixing strip portions 12 can be easily wound respectively around parts that are in the vicinities of the both ends of the protective sheet portion 11 that covers the outer circumference of the trunk harness 2A, and furthermore unintentional loosening hardly occurs after the winding.

As described above, in the embodiment, according to the protective member 10 for the branching point S of the wire harness WH, and the branching structure, the thickness of the fixing strip portions 12 that are wound respectively around the two places on the trunk harness 2A which are separated from each other across the branch harness 2B, thereby fixing the protective member 10 is smaller than that of the protective sheet portion 11 that is wound around the circumference of the trunk harness 2A in the branching point S of the wire harness WH, thereby protecting the trunk harness 2A. While the trunk harness 2A in the branching point S is satisfactorily protected by the protective sheet portion 11, therefore, the rigidity of the fixing strip portions 12 can be suppressed, and the work of winding the fixing strip portions 12 can be facilitated. Moreover, loosening of the fixing strip portions 12 after the winding can be prevented from occurring.

Furthermore, the protective member 10 is configured by: the first base member 21 that forms the whole region of the protective sheet portion 11 and the fixing strip portions 12; and the second base member 22 that is stacked on the region of the protective sheet portion 11 in the first base member 21. Namely, the second base member 22 is stacked on the first base member 21. Therefore, the protective sheet portion 11 and fixing strip portions 12 that have different thicknesses can be easily manufactured.

When the first base member 21 is formed by a highly flexible resin material, and the second base member 22 is formed by a highly abrasion resistant resin material, for example, the work of winding the fixing strip portions 12 can be facilitated and performed while the trunk harness 2A in the branching point S is further satisfactorily protected. Moreover, loosening of the fixing strip portions 12 after the winding can be prevented more properly from occurring.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

Figure 7:
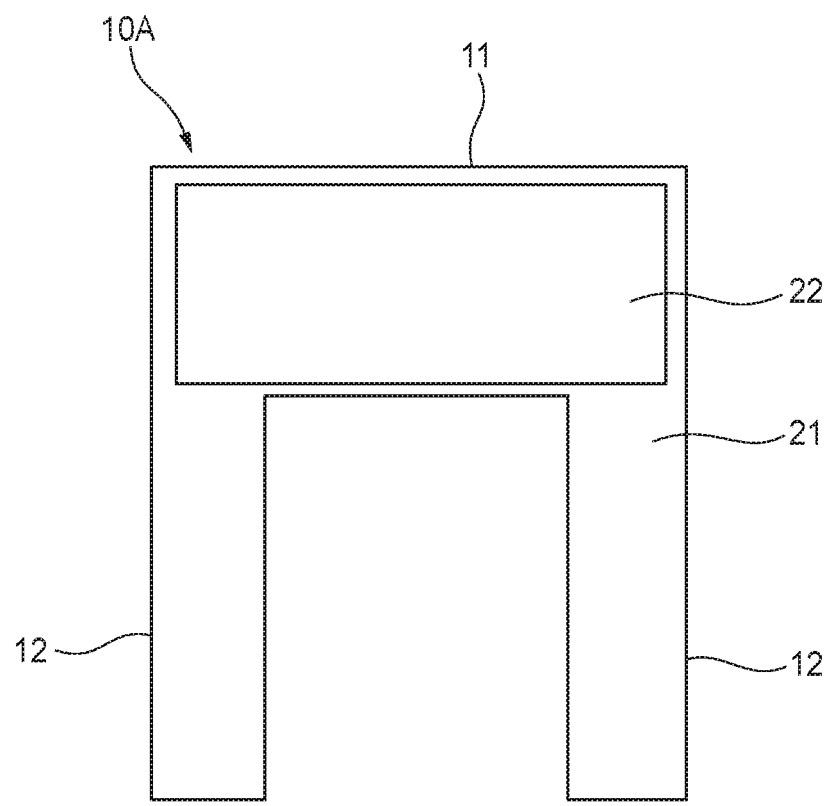
FIG. 7 is a plan view of a protective member of a modification.

In the above-described embodiment, for example, the pair of fixing strip portions 12 extend in different directions from the end portions of the protective sheet portion 11, respectively. As in a protective member 10A of a modification shown in FIG. 7, however, the fixing strip portions 12 may be disposed so as to extend from the end portions of the protective sheet portion 11 in the same direction.

Figure 8:
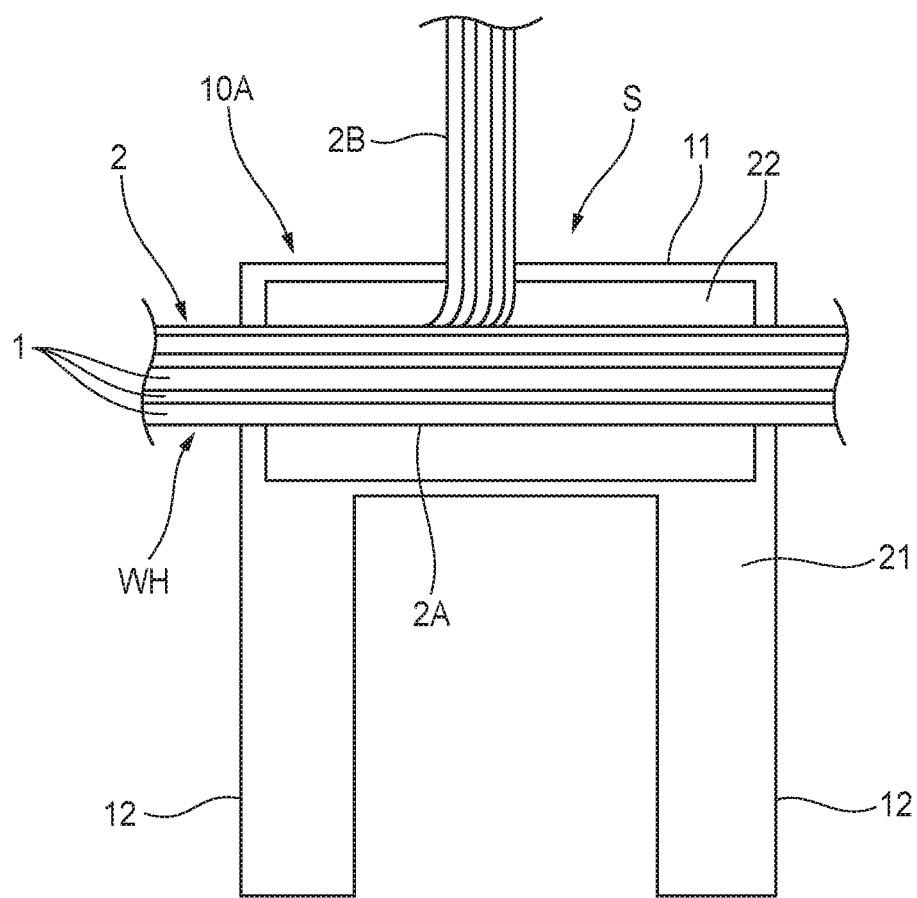
FIG. 8 is a plan view of the protective member of the modification on which the branching point of the wire harness is placed, describing the procedure of attachment of the protective member to the branching point.

In order to attach the protective member 10A of the modification to the branching point S of the wire harness WH, the branching point S of the wire harness WH is placed on the protective member 10 on the side of the adhesive layers 21a, 22a of the first base member 21 and the second base member 22 as shown in FIG. 8. Specifically, the trunk harness 2A in the branching point S are placed in the middle in the width direction along the longitudinal direction of the protective sheet portion 11. At this time, the branch harness 2B are placed in the middle in the longitudinal direction of the protective sheet portion 11.

Next, the protective sheet portion 11 of the protective member 10A is bent toward the inner side where the wire harness WH is placed, and bonded by the adhesive layer 22*a* disposed on the second base member 22, to the circumference of the trunk harness 2A of the wire harness WH, thereby forming a state where the trunk harness 2A are covered by the protective sheet portion 11. Thereafter, the fixing strip portions 12 of the protective member 10A are wound around the protective sheet portion in the same direction so that the adhesive layer 21*a* is in the inner side. As a result, parts that are in the vicinities of the both ends of the protective sheet portion 11 that covers the outer circumference of the trunk harness 2A are fixed by the fixing strip portions 12, respectively.

In the above-described embodiment, for example, the protective member 10 excluding the adhesive layers 21*a*, 22*a* has a substantial two-layer structure configured by the first base member 21 and the second base member 22. However, the protective member may be configured so as to have a three or more-layer structure as far as the thickness of the fixing strip portions 12 is smaller than that of the protective sheet portion 11. Furthermore, the pair of fixing strip portions 12 may have different thicknesses.

Moreover, the protective member 10 may be configured so that two or more fixing strip portions 12 are disposed on the protective sheet portion 11. Furthermore, the fixing strip portions 12 may be disposed so as to extend in directions other than directions that are perpendicular to the longitudinal direction of the protective sheet portion 11.

According to the above exemplary embodiments, a protective member (10) for a wire harness (WH) having a branching point (S) between a trunk harness (2A) and a branch harness (2B) comprises:

a protective sheet portion (11) to be wound around an outer circumference of at least the trunk harness (2A) near the branching point (S); and a pair of band-shaped fixing strip portions (12) extending from the protective sheet portion (11) and to be wound around on the trunk harness (2A) at a pair of spots, the branching point (S) being between the pair of the spots, the protective member (10) comprising a resin, the fixing strip portions (12) being smaller in thickness than the protective sheet portion (11).

According to the thus configured protective member for a wire harness branching point, the thickness of the fixing strip portions that are to be wound around two places which are on the trunk harness, and which are separated from each other across the branching point is smaller than that of the protective sheet portion that, in the branching point of the wire harness, is wound around the circumference of the trunk harness to protect the trunk harness. According to the configuration, the protective member can be adequately fixed to the trunk harness by the fixing strip portions having the relatively small thickness, while the branching point is appropriately protected by the protective sheet portion having the relatively large thickness. Therefore, the protective member having the above-described configuration can achieve both an improvement of the performance to protect the branching point of the wire harness, and secure attachment to the branching point.

In the aforementioned protective member (10), the protective sheet portion (11) may have a first base member (21) and a second base member (22) stacked on the first base member (21), and the fixing strip portions (12) may extend from the first base member (21).

According to the thus configured protective member for a wire harness branching point, the fixing strip portions are configured by the first base member, and the protective sheet portion is configured by stacking the second base member on the first base member, whereby the protective sheet portion and fixing strip portions that have different thicknesses can be easily manufactured.

In the aforementioned protective member (10), the first base member (21) may comprise a first resin and the second base member (22) may comprise a second resin different from the first resin.

According to the thus configured protective member for a wire harness branching point, the materials constituting the first base member and the second base member can be selected in accordance with required characteristics of the protective sheet portion and the fixing strip portions. Therefore, the performance of the protective member can be further improved. When the first base member is formed by a highly flexible resin material, and the second base member is formed by a highly abrasion resistant resin material, for example, both the performance to protect the branching point of the wire harness, and that to attachment to the branching point can be improved.

According to the above exemplary embodiments, a branching structure comprises:

a wire harness (WH) having a branching point (S) between a trunk harness (2A) and a branch harness (2B); and the aforementioned protective member (10), the protective member (10) is attached to the branching point (S) to wind the protective sheet portion (11) around the outer circumference of at least the trunk harness (2A) near the branching point (S), and to wind the pair of the band-shaped fixing strip portions (12) extending from the protective sheet portion (11) around on the trunk harness (2A) at the pair of spots to sandwich the branching point (S).

According to the thus configured branching structure of a wire harness, the thickness of the fixing strip portions that are to be wound around two places which are on the trunk harness, and which are separated from each other across the branching point is smaller than that of the protective sheet portion that, in the branching point of the wire harness, is wound around the circumference of the trunk harness to protect the trunk harness. According to the configuration, the protective member can be adequately fixed to the trunk harness by the fixing strip portions having the relatively small thickness, while the branching point is appropriately protected by the protective sheet portion having the relatively large thickness. Therefore, the branching structure having the above-described configuration enables the protective member to be surely attached to the branching point of the wire harness while appropriately protecting the branching point.

According to the invention, it is possible to provide a protective member for a wire harness branching point that can realize both an improvement of the performance to protect a branching point of a wire harness, and secure attachment to the branching point, and a branching structure of a wire harness in which the protective member is used.

What is claimed is:

1. A protective member for a wire harness having a branching point between a trunk harness and a branch harness, the protective member consisting only of:

a protective sheet portion formed into a rectangular shape and to be wound around an outer circumference of at least the trunk harness near the branching point, the protective sheet portion comprising:

a first base member; and a second base member stacked on the first base member on a region of the protective sheet portion; and a pair of band-shaped fixing strip portions extending from two parts on the protective sheet portion and to be wound around the trunk harness at the two parts on the protective sheet portion, the branching point being between the two parts, wherein the two parts positioned at both ends of the protective sheet portion in a direction in which the trunk harness extends, the pair of band-shaped fixing strip portions are smaller in thickness than the two parts of the protective sheet portion, and one of the pair of band-shaped fixing strip portions extends from the protective sheet portion only in a first direction perpendicular to the direction in which the trunk harness extends and another of the pair of band-shaped fixing strip portions extends from the protective sheet portion only in a second direction perpendicular to the direction in which the trunk harness extends, the second direction being an opposite direction to the first direction, wherein the pair of band-shaped fixing strip portions extend from the first base member and the second base member of the protective sheet portion.

2. The protective member according to claim 1, wherein the first base member comprises a first resin and the second base member comprises a second resin different from the first resin.

3. A branching structure comprising:

the wire harness having the branching point between the trunk harness and the branch harness; and the protective member according to claim 1, the protective member is attached to the branching point to wind the protective sheet portion around the outer circumference of at least the trunk harness near the branching point, and to wind the pair of band-shaped fixing strip portions extending from the protective sheet portion around the trunk harness at the two parts to sandwich the branching point.

4. The protective member according to claim 2, wherein the second base member has an adhesive layer configured to bond the second base member of the protective sheet portion to the outer circumference of the trunk harness.

5. The protective member according to claim 1, wherein the protective sheet portion has the rectangular shape having a pair of short sides and a first side and a second side both longer than the pair of short sides, the one of the pair of band-shaped fixing strip portions extends from the first side and the other of the pair of band-shaped fixing strip portions extends from the second side.

* * * * *